Figure 1:
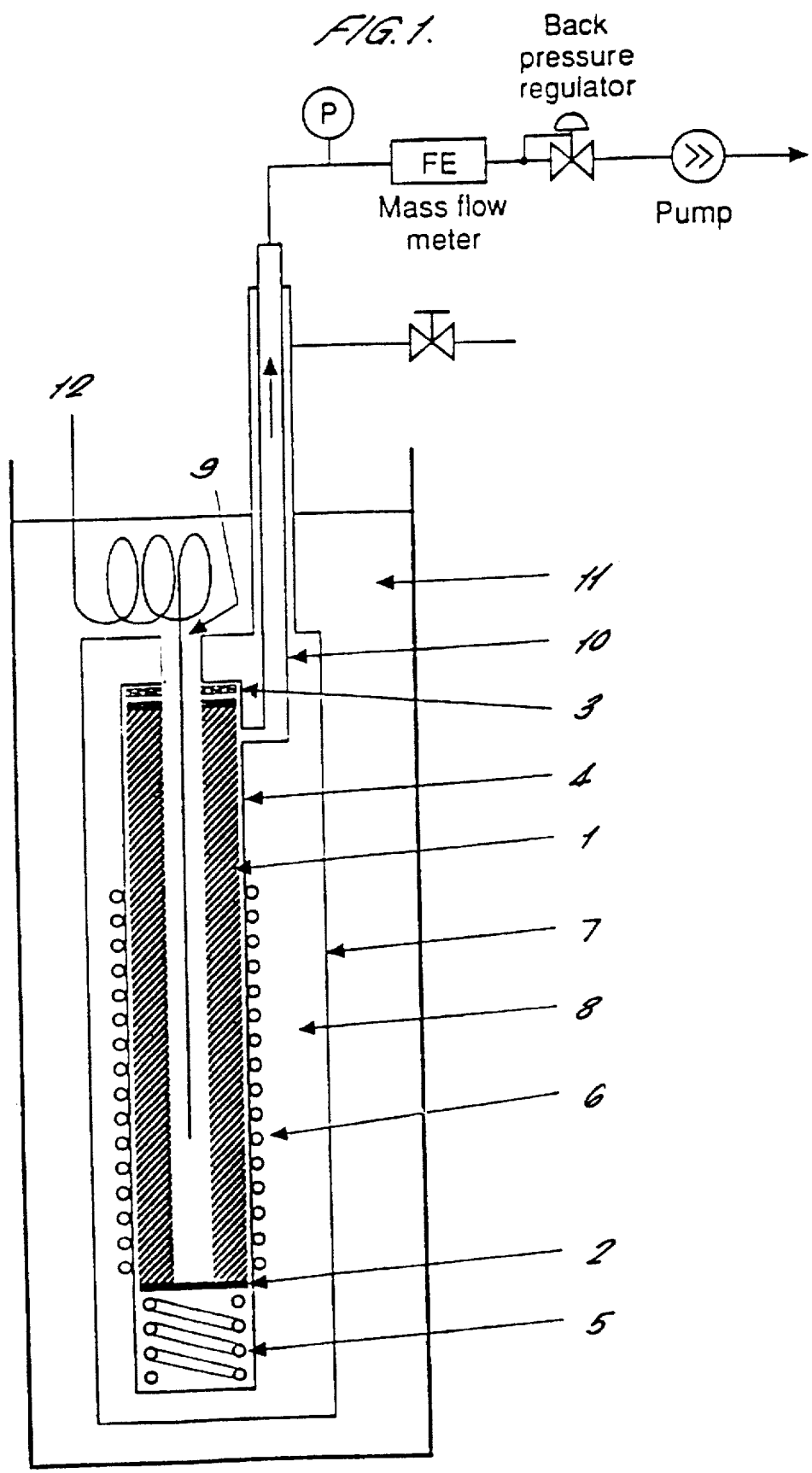

United States Patent [19]
Hemmerrich et al.

[11] Patent Number: 5,729,984
[45] Date of Patent: Mar. 24, 1998

[54] EVAPORATIVE TRANSPIRATION PUMP HAVING A HEATER AND A POUOUS BODY

[75] Inventors: Johann Ludwig Hemmerrich, Oxford; Paul Milverton, Harwell, both of United Kingdom

[73] Assignee: European Atomic Energy Community (Euratom), Plateau du Kirchberg, Luxembourg

[21] Appl. No.: 545,579

[22] PCT Filed: May 13, 1994

[86] PCT No.: PCT/EP94/01636

§ 371 Date: Nov. 20, 1995

§ 102(e) Date: Nov. 20, 1995

[87] PCT Pub. No.: WO94/28558

PCT Pub. Date: Dec. 8, 1994

[30] Foreign Application Priority Data

May 20, 1993 [GB] United Kingdom ............... 9310463

[51] Int. Cl.⁶ .................. G21F 9/08; B01D 1/30
[52] U.S. Cl. ................................... 62/50.2
[58] Field of Search .................. 417/207; 62/50.2, 62/50.6

[56] References Cited

U.S. PATENT DOCUMENTS

| | | | |
|---|---|---|---|
| 1,894,497 | 1/1933 | Rowland | 62/50.2 X |
| 2,683,582 | 7/1954 | Kerr | 62/50.2 X |
| 3,153,439 | 10/1964 | Golden | 62/50.2 X |
| 3,565,551 | 2/1971 | Hobson | 417/207 |
| 4,255,646 | 3/1981 | Dragoy et al. | 62/50.2 |
| 4,973,566 | 11/1990 | Readey et al. | |

OTHER PUBLICATIONS

"Themal Conduction in Solids", McGrawhill Encyclopedia of Science & Technology, © 1992, pp. 277–279.

"A Study of Thermal Transpiration for the Development of a New Type of Gas Pump", IECEC, 1968, pp. 961–972, by Hopfinger et al.

Hemmerich et al., Fusion Engineering and Design, Nov. 1989, Amsterdam, 93–100.

Ulrich et al., Fusion Technology, vol. 21, Mar. 1992, Lagrange Park, 891–895.

Ulrich et al., Fusion Technology, vol. 21, Mar. 1992, pp. 891–895.

Grant & Hackh's Chemical Dictionary, McGraw-Hill Book Company, New York, Table 94.

*Primary Examiner*—Richard E. Gluck
*Attorney, Agent, or Firm*—Bacon & Thomas

[57] ABSTRACT

The present invention relates to an evaporative transpiration pump having an inlet for liquids, an outlet for gases, a porous body disposed between the inlet and the outlet. A heating means is disposed at the outlet side of the porous body. The thermal conductivity of the porous body is no greater than 5 $Wm^{-1}K^{-1}$ and is preferably no greater than 1 $Wm^{-1}K^{-1}$. The pump is particularly suitable for use in multi-column cryodistillation apparatus.

19 Claims, 2 Drawing Sheets

EVAPORATIVE TRANSPIRATION PUMP HAVING A HEATER AND A POUOUS BODY

The invention relates to an evaporative transpiration pump. Such pumps are capable of a number of applications but are particularly suitable for use in multi-column cryodistillation systems.

Transpiration pumps and their principles of operation are known. They employ the same physical principle as a tree does to drive sap from the roots to the leaves and facilitate transpiration. A porous barrier is provided with liquid on one side and a heater on the other. The porous barrier retains the liquid by surface tension until the gas pressure on the heated side exceeds the pressure on the liquid side by the amount $$\Delta p = \frac{4\sigma}{d_{\mathit{eff}}}$$

where $\Delta p$ is the pressure difference, $\sigma$ is the surface tension and $d_{\mathit{eff}}$ is the "effective" pore size. The liquid is then sucked through the barrier by capillary action and evaporated by the heater in just the same way as water is evaporated from leaves by the heat of the sun. The above equation is strictly valid only for a barrier consisting of identical capillaries with circular cross-section. However, for example, a transpiration pump having a barrier which is a sinter filter with an effective pore size of $1 \times 10^{-6}$ m pumping liquid hydrogen with a surface tension of $2.5 \times 10^{-3}$ Nm$^{-1}$ can be expected to provide a pressure difference of up to 10 KPa.

Evaporative transpiration pumps may be used for pumping any liquid which is reasonably volatile and can be easily evaporated by the heater. However they have found particular application in very low temperature pumping operations such as in multi-column cryodistillation processes. Such apparatus is described in Fusion Technology 21 (1992) 891–895 where it is used for the processing of the waste gas mixtures which exhaust from a nuclear fusion reactor. These waste gases contain mixtures of hydrogen isotopes such as tritium (T) and deuterium(D) including heteromolecular species such as HD, HT and DT. The cryodistillation apparatus separates such mixtures into three homomolecular product streams, $H_2$, $D_2$ and $T_2$ but it requires pumps to drive the various side streams through catalytic equilibrators and/or recirculation flows against the natural pressure gradient in a system which is multiply interconnected.

Two kinds of pumps have in the past been generally used in multi-column cryodistillation systems, mechanical pumps or hydrostatic syphon pumps.

Mechanical pumps have the disadvantage that in order to be tritium compatible all components must be made entirely of metal and thus they suffer from fatigue over long operational periods. Also they usually need to be operated at room temperature.

Hydrostatic syphon pumps use a U-tube arrangement with a heater in one leg to produce a cold gas stream at a pressure differential corresponding to the hydrostatic difference between liquid levels in both legs. However, due to the low specific gravity of liquefied hydrogen isotopes, only small pressure differences can be generated when other restrictions are taken into account and the devices are prone to pressure oscillations which are difficult to dampen and may adversely effect the separation efficiency of distillation columns.

Evaporative transpiration pumps do not have any of the above drawbacks because of their simple construction and absence of moving parts. Such pumps have therefore been tried in multi-column cryodistillation systems as described in Fusion Engineering and Design 11 (1989) 93–100. However in earlier applications the porous body has comprised a material of relatively high thermal conductivity e.g. nickel or stainless steel. Metal sinter filters prove perfectly adequate for pumping a volatile liquid material containing a single element such as single isotope liquid hydrogen ($LH_2$) or liquid nitrogen ($LN_2$), the mass flows of the cold gas being directly proportional to the heater power applied as calculated from the heat of evaporation of the liquid. Thus heater power is only used to evaporate liquid off the porous surface without any superheating of the resulting saturated vapour.

However it has been observed that known evaporative transpiration pumps containing metal porous filters function poorly when pumping liquids which are a mixture of normally gaseous elements such as $H_2$–$D_2$ or liquid air, where one component of a mixture is more volatile than another. After very short operating periods of 1 minute or less, the pumps do not produce adequate mass flows and reach at best about 10% of their design flow. The present inventors have demonstrated that the reason for this poor performance is that with mixtures there is a preferential distillation of the more volatile component. This leads to enrichment of the less volatile component on the heated side of the porous metal filter which in turn causes a rise in the temperature of the filter wall. Because the metal filter has high thermal conductivity this heat is rapidly transferred to the liquid side of the filter and causes the incoming liquid to boil before it can be sucked through the capillaries of the filter. Thus there is a rapid deterioration in flow rate.

The present inventors have now developed an evaporative transpiration pump which can adequately pump mixtures without the problems set out above by including a porous filter of low thermal conductivity.

Thus an evaporative transpiration pump in accordance with the invention comprises an inlet for liquids, an outlet for gases, a porous body disposed between the inlet and the outlet and heating means disposed at the outlet side of the porous body wherein the thermal conductivity of said porous body is no greater than 5 Wm$^{-1}$K$^{-1}$ and preferably is no greater than 1 Wm$^{-1}$K$^{-1}$.

The porous body may comprise a ceramic material such as silica, a metal silicate or mixture is thereof. Preferred ceramic materials are mullite or a composition comprising 50% $SiO_2$, 40% $ZrSiO_4$ and 10% $Al_2O_3$.

As an alternative certain porous plastics materials may be suitable for the porous body. Also a body falling within the required conductivity range may be constructed by sandwiching between two porous metal plates, diatomaceous earth or a powdered form of one of the materials referred to above.

A suitable pore size for the porous body depends on the surface tension of the liquefied gas to be pumped and the pressure differential it is desired to achieve. It can be readily calculated from the equation given on page 1. As the relationship on page 1 gives the maximum achievable pressure (at stagnation, i.e. zero flow rate), it is preferable if the pore size of the porous body complies with the relationship:

$$d_{\mathit{eff}} < \frac{4\sigma}{\Delta p}$$

and more preferable if it complies with the relationship:

$$d_{\mathit{eff}} \approx 0.1 \frac{4\sigma}{\Delta p}$$

as in this range the flow rate is practically independent of $\Delta p$.

In a test model of a pump in accordance with the invention it can be shown that, for example, a body with a pore size selected to generate a pressure differential of about 12 KPa in nitrogen will generate a pressure differential of about 2.5 KPa for hydrogen as a result of the difference in surface tension of these two liquefied gases.

The porous body may be a variety of shapes but the most preferred shape is a cylinder or tube. The heating means may be disposed on the inside or the outside of the tube depending on the direction of flow of the liquid being pumped. Preferably the heating means extends over only the lower 70% or so of the tube to ensure that vapour generated at the surface of the porous body in the heated zone leaves the device without superheating. This can be disadvantageous for the further processing of the vapour.

An evaporative transpiration pump in accordance with the invention is suitable for pumping any volatile liquid whatever the temperature of the operation. However, as stated above, it is particularly suited to low temperature pumping operations such as multi-column cryodistillation processes. Where such systems are used to distill waste mixtures from nuclear fusion reactors containing hydrogen, deuterium or tritium, the pump of the invention has particular advantages. Firstly, the mass flow is predictably proportional to heater power over a wide range of differential pressures and the pump does not cause undue pressure fluctuations in the system, as with more conventional pumps. Secondly, it is simple in construction with no moving parts and has a low liquid inventory. Finally it can be made of materials not substantially affected by the presence of tritium.

Figure 2:
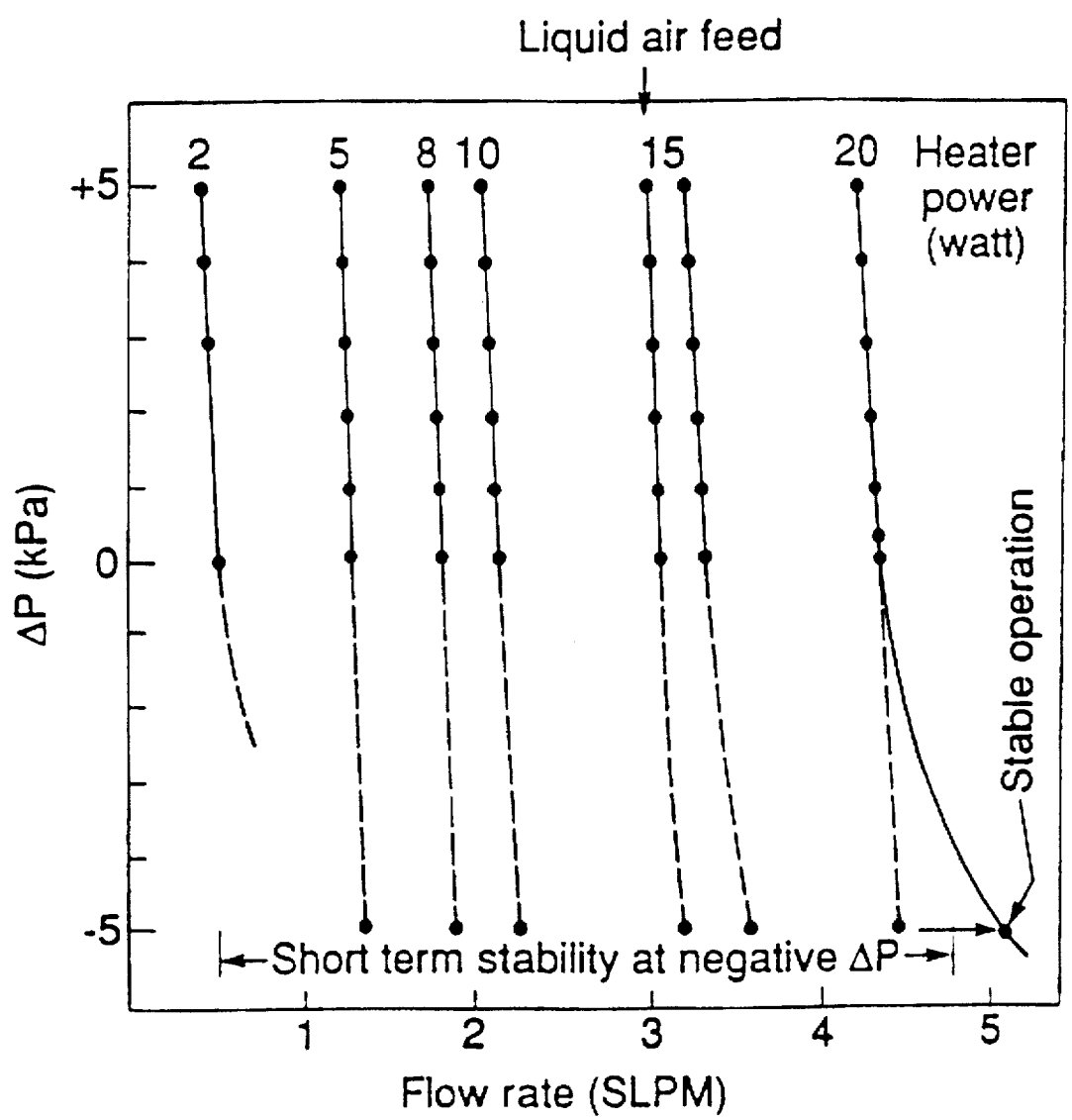

The invention will now be described by way of example with reference to the accompanying drawings in which:

FIG. 1 is a vertical section through an assembly containing an evaporative transpiration pump in accordance with the invention and FIG. 2 shows the characteristics of flow rate vs differential pressure at selected heater powers for the pump of FIG. 1 pumping liquid nitrogen and liquid air.

Referring to FIG. 1 the pump consists of a tubular porous body (1) of thermal conductivity no greater than 5 $Wm^{-1}K^{-1}$, which is sealed at its lower end by a Covar disc (2) which is attached with a ceramic cement. At its upper end the tube (1) is sealed to a pump housing (4) and the liquid entry (9) by a cemented Covar/soft aluminium gasket arrangement (3). The entire tube (1) is supported within the housing (4) by a spring (5).

A heating coil (6) is fitted around the outside of the tube (1) extending over only about the lower 70%. The pump housing (4) has an inner wall and an outer wall (7) with an evacuated space (8) in between. The housing (4) is provided with an inlet for the liquid (9) and an outlet for the gas (10).

In FIG. 1 the pump is used in a test apparatus to pump liquid nitrogen or liquid air. Thus the entire pump apparatus is immersed in a dewar of liquid nitrogen (11). The $LN_2$ enters the inside of the porous tube (1) through liquid inlet (9) and after passing through the porous walls of tube (1) by capillary action is evaporated by the heater (6). Gaseous nitrogen leaves via the outlet (10). The pump may be tested with liquid air in the dewar instead of liquid nitrogen. Alternatively dry air may be fed into the liquid nitrogen via the dry air feed (12).

It should be understood that FIG. 1 represents an experimental arrangement and that in normal use the liquid inlet (9) is connected directly to the source of the liquid to be pumped.

The assembly shown in FIG. 1 was tested pumping liquid nitrogen and liquid air using a porous tube of 50% $SiO_2$, 40% $ZrSiO_4$ and 10% $Al_2O_3$ and having an 8 mm inner diameter, a 25 mm outer diameter and a length of 150 mm.

The results are shown in FIG. 2 which displays the characteristics of flow rate vs differential pressure for a few selected heater powers for the full operating regime of up to 5 KPa extending down to negative differential pressure of −5 KPa.

With liquid nitrogen, at negative pressures of −5 KPa, the flow rates shown in FIG. 2 became unstable after some time (after about 10 seconds at a heater power of 2 watts and after about 60 seconds for a heater power of 15 watts) as liquid sucked through the porous body left the gas outlet in the form of droplets and evaporated there.

However operation was stable at negative pressures for a heater power of 20 watts. Further the pumping operation was entirely stable for all heater powers at positive differential pressures.

In one test run liquid air was supplied at a flow rate of 3.3 SLPM (standard liters per minute) to the pump. Within 10 minutes of starting the air feed, the mass flow had dropped by only 8.5% and then remained stable, subsequently. This is contrary to what would happen using a porous filter of high thermal conductivity. The pump's ability to stably pump liquid air demonstrates that subject to suitable adjustments to pore size the pump would be equally suited to pumping hydrogen isotope mixtures.

What is claimed is:

1. An evaporative transpiration pump comprising an inlet for liquids, an outlet for gases, a porous body which is mullite or a material having a composition: $SiO_2$ 50%; $ZrSiO_4$ 40%; $Al_2O_3$ 10%, which body is disposed between the inlet and the outlet and heating means disposed at the outlet side of the porous body wherein the thermal conductivity of said porous body is no greater than 5 $Wm^{-1}K^{-1}$.

2. An evaporative transpiration pump as claimed in claim 1 wherein the thermal conductivity of said porous body is no greater than 1 $Wm^{-1}K^{-1}$.

3. An evaporative transpiration pump comprising an inlet for liquids, an outlet for gases, a porous body comprising a ceramic material which is silica, a metal silicate or a mixture thereof disposed between the inlet and the outlet and heating means disposed at the outlet side of the porous body wherein the thermal conductivity of said porous body is no greater than 1 $Wm^{-1}K^{-1}$.

4. An evaporative transpiration pump as claimed in claim 1 wherein the porous body comprises a plastics material.

5. An evaporative transpiration pump as claimed in claim 3 wherein the porous body comprises diatomaceous earth sandwiched between porous metal plates.

6. An evaporative transpiration pump as claimed in claim 7 wherein the porous body has a pore size in accordance with the relationship:

$$d_{\it eff} < \frac{4\sigma}{\Delta p}$$

where $\Delta p$ is the pressure difference, $\sigma$ is the surface tension and $d_{\it eff}$ is the "effective" pore size.

7. An evaporative transpiration pump as claimed in claim 6 wherein the porous body has a pore size in accordance with the relationship:

$$d_{\it eff} = 0.1 \frac{4\sigma}{\Delta p}$$

8. An evaporative transpiration pump as claimed in claim 3 wherein the porous body is in the form of a tube.

9. An evaporative transpiration pump as claimed in claim 8 wherein the liquid inlet is on the inside of said tube and the gas outlet is on the outside of said tube.

10. An evaporative transpiration pump as claimed in claim 3 wherein the porous body comprises a ceramic material in powder form.

11. An evaporative transpiration pump as claimed in claim 3 wherein the porous body comprises silica, a metal silicate or a mixture thereof, in powder form.

12. An evaporative transpiration pump as claimed in claim 3 wherein the porous body is mullite or a material of composition 50% $SiO_2$, 40% $ZrSiO_4$ and 10% $Al_2O_3$, in powder form.

13. An evaporative transpiration pump as claimed in claim 3 wherein the porous body comprises a plastics material in powder form.

14. An evaporative transpiration pump comprising an inlet for liquids, an outlet for gases, a porous body in the form of a tube disposed between the inlet and the outlet and heating means disposed outside of the porous body wherein the thermal conductivity of said porous body is no greater than 5 $Wm^{-1}K^{-1}$ and wherein the heating means extends over the lower 70% of the outlet side of said tube.

15. An evaporative transpiration pump as claimed in claim 14 wherein the liquid inlet is on the inside of said tube and the gas outlet is on the outside of said tube.

16. An evaporative transpiration evaporative transpiration pump comprising an inlet for liquids, an outer for gases, a porous body comprising a ceramic material which is silica, a metal silicate or a mixture thereof disposed between the inlet and the outlet and heating means disposed at the outer side of the porous body wherein the thermal conductivity of said porous body, at the operative temperature of the pump, is no greater than 1 $Wm^{-1}K^{-1}$.

17. An evaporative transpiration evaporative transpiration pump comprising an inlet for liquids, an outlet for gases, a porous body in the form of a tube disposed between the inlet and the outlet and heating means disposed outside of the porous body wherein the thermal conductivity of said porous body, at the operative temperature of the pump, is no greater than 5 $Wm^{-1}K^{-1}$ and wherein the heating means extends over the lower 70% of the outlet side of said tube.

18. A multi-column cryodistillation system for processing waste gases from a nuclear fusion reactor which is fitted with at least one evaporative transpiration pump comprising an inlet for liquids, an outlet for gases, a porous body comprising a ceramic material which is silica, a metal silicate or a mixture thereof disposed between the inlet and the outlet and heating means disposed at the outlet side of the porous body wherein the thermal conductivity of said porous body is no greater than 1 $Wm^{-1}K^{-1}$.

19. A method of processing waste gas mixtures which issue from a nuclear fusion reactor which comprises feeding said waste gas mixture to a multi-column cryodistillation system of claim 18.

* * * * *